US012242602B2

(12) United States Patent
Neil et al.

(10) Patent No.: US 12,242,602 B2
(45) Date of Patent: *Mar. 4, 2025

(54) MALICIOUS ENTERPRISE BEHAVIOR DETECTION TOOL

(71) Applicant: Microsoft Technology Licensing, LLC, Redmond, WA (US)

(72) Inventors: Joshua Charles Neil, Redmond, WA (US); Evan John Argyle, Seattle, WA (US); Anna Swanson Bertiger, Seattle, WA (US); Lior Granit, Netanya (IL); Yair Tsarfaty, Nahariya (IL); David Natan Kaplan, Hertsmere (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,790

(22) Filed: Dec. 22, 2022

(65) Prior Publication Data

US 2023/0129144 A1 Apr. 27, 2023

Related U.S. Application Data

(63) Continuation of application No. 16/917,318, filed on Jun. 30, 2020, now Pat. No. 11,556,636.

(51) Int. Cl.
*G06F 21/55* (2013.01)
*G06F 16/951* (2019.01)
*G06F 21/57* (2013.01)

(52) U.S. Cl.
CPC .......... *G06F 21/554* (2013.01); *G06F 16/951* (2019.01); *G06F 21/577* (2013.01); *G06F 2221/034* (2013.01)

(58) Field of Classification Search
CPC .... G06F 21/554; G06F 16/951; G06F 21/577; G06F 2221/034; G06F 21/566; H04L 63/145; H04L 63/1425
See application file for complete search history.

(56) References Cited

U.S. PATENT DOCUMENTS 7,139,837 B1 * 11/2006 Parekh .................... H04L 45/48
709/239
9,064,210 B1 6/2015 Hart
(Continued)

OTHER PUBLICATIONS

Hasan et al., Towards Optimal Cyber Defense Remediation in Energy Delivery Systems, 2019 IEEE Global Communications Conference (GLOBECOM), IEEE, Dec. 9, 2018 (Dec. 9, 2019) (Year: 2018).*

(Continued)

*Primary Examiner* — Meng Li
(74) *Attorney, Agent, or Firm* — Shook, Hardy & Bacon L.L.P.

(57) ABSTRACT

Embodiments of the present disclosure provide systems, methods, and non-transitory computer storage media for identifying malicious enterprise behaviors within a large enterprise. At a high level, embodiments of the present disclosure identify sub-graphs of behaviors within an enterprise based on probabilistic and deterministic methods. For example, starting with the node or edge having the highest risk score, embodiments of the present disclosure iteratively crawl a list of neighbors associated with the nodes or edges to identify subsets of behaviors within an enterprise that indicate potentially malicious activity based on the risk scores of each connected node and edge. In another example, embodiments select a target node and traverse the connected nodes via edges until a root-cause condition is met. Based on the traversal, a sub-graph is identified indicating a malicious execution path of traversed nodes with (Continued)

associated insights indicating the meaning or activity of the node.

20 Claims, 11 Drawing Sheets

(56) References Cited

U.S. PATENT DOCUMENTS

| | | | |
|---|---|---|---|
| 9,171,158 B2 | 10/2015 | Akoglu | |
| 9,202,049 B1* | 12/2015 | Book | G06F 21/562 |
| 9,256,739 B1* | 2/2016 | Roundy | H04L 63/1425 |
| 9,306,962 B1 | 4/2016 | Pinto | |
| 9,659,085 B2 | 5/2017 | Wang | |
| 9,792,443 B1* | 10/2017 | Sheridan | G06F 21/563 |
| 10,192,058 B1* | 1/2019 | Jalil | G06F 21/552 |
| 10,630,704 B1* | 4/2020 | Ghosh | H04L 63/1416 |
| 10,686,816 B1 | 6/2020 | Shintre | |
| 10,735,272 B1* | 8/2020 | Saurabh | G06F 21/554 |
| 10,747,568 B2* | 8/2020 | Ahmed | G06F 9/45558 |
| 10,958,667 B1* | 3/2021 | Maida | H04L 63/1425 |
| 11,023,612 B2 | 6/2021 | Koster | |
| 11,030,311 B1* | 6/2021 | Lopez | G06N 20/00 |
| 11,115,461 B1* | 9/2021 | Kim | H04L 67/06 |
| 11,120,590 B1* | 9/2021 | Cecchi | G06F 8/34 |
| 11,121,874 B2* | 9/2021 | Jose | G06Q 20/02 |
| 11,126,618 B1* | 9/2021 | Padmanabhan | G06F 16/252 |
| 11,138,516 B2* | 10/2021 | Harris | G06N 7/01 |
| 11,165,803 B2 | 11/2021 | Brown | |
| 11,206,313 B1* | 12/2021 | Dey | G06F 21/6218 |
| 11,403,131 B2* | 8/2022 | Mohapatra | G06F 9/445 |
| 11,443,224 B2* | 9/2022 | Meron | G06N 20/00 |
| 11,539,749 B2 | 12/2022 | Canzanese, Jr. | |
| 11,550,604 B2* | 1/2023 | Mody | G06F 3/0484 |
| 11,586,936 B2* | 2/2023 | Reddy | G06N 5/02 |
| 11,615,077 B1* | 3/2023 | Sroka | G06N 5/045 707/703 |
| 11,650,579 B2* | 5/2023 | Maruyama | G05B 23/0229 706/12 |
| 11,664,972 B2* | 5/2023 | Wilke | G06F 21/64 713/189 |
| 11,676,044 B1* | 6/2023 | Mazza | G06N 5/043 706/11 |
| 11,734,029 B1* | 8/2023 | Govindan | G06Q 10/1095 715/745 |
| 11,757,849 B2* | 9/2023 | Crabtree | G06F 21/554 |
| 11,757,918 B2 | 9/2023 | Clifford | |
| 11,765,207 B1* | 9/2023 | McCarthy | G06F 40/186 |
| 11,797,638 B2* | 10/2023 | Stone | G06F 8/38 |
| 11,860,613 B2* | 1/2024 | Maury | G06F 30/27 |
| 11,860,914 B1* | 1/2024 | Qadrud-Din | G06F 16/3329 |
| 11,875,360 B2* | 1/2024 | Karani | G06Q 30/01 |
| 2009/0077666 A1* | 3/2009 | Chen | G06Q 10/0631 726/25 |
| 2012/0173294 A1* | 7/2012 | Olson | G06Q 10/067 705/342 |
| 2012/0278021 A1 | 11/2012 | Lin | |
| 2012/0304007 A1 | 11/2012 | Hanks | |
| 2014/0165195 A1 | 6/2014 | Brdiczka | |
| 2014/0207862 A1* | 7/2014 | Domke | G06Q 10/06 709/204 |
| 2015/0074806 A1 | 3/2015 | Roundy | |
| 2015/0106324 A1 | 4/2015 | Puri | |
| 2015/0234688 A1* | 8/2015 | Dageville | G06F 9/4881 718/105 |
| 2016/0088006 A1 | 3/2016 | Gupta | |
| 2016/0134752 A1* | 5/2016 | Aldecoa | H04M 3/2236 379/88.01 |
| 2016/0217378 A1 | 7/2016 | Bellala | |
| 2016/0226905 A1* | 8/2016 | Baikalov | H04L 63/1433 |
| 2017/0063908 A1 | 3/2017 | Muddu | |
| 2017/0063909 A1 | 3/2017 | Muddu | |
| 2017/0279818 A1* | 9/2017 | Milazzo | G06F 21/564 |
| 2017/0353460 A1* | 12/2017 | Knapp | H04L 9/3236 |
| 2018/0013777 A1* | 1/2018 | DiValentin | G06Q 10/0635 |
| 2018/0039696 A1* | 2/2018 | Zhai | G06F 16/9024 |
| 2018/0248904 A1 | 8/2018 | Villella | |
| 2018/0302423 A1 | 10/2018 | Muddu | |
| 2018/0322456 A1* | 11/2018 | Vesely | G06Q 10/10 |
| 2018/0337935 A1 | 11/2018 | Marwah | |
| 2018/0365289 A1* | 12/2018 | Brown | G06F 16/24535 |
| 2018/0375883 A1 | 12/2018 | Bhatkar | |
| 2019/0130290 A1* | 5/2019 | Kerber | G06N 5/022 |
| 2019/0227726 A1* | 7/2019 | Zaydman | G06F 16/113 |
| 2020/0004888 A1 | 1/2020 | Rossi | |
| 2020/0036701 A1 | 1/2020 | Mathew | |
| 2020/0042707 A1* | 2/2020 | Kucherov | G06F 3/0683 |
| 2020/0204449 A1* | 6/2020 | Bitterfeld | G06F 16/27 |
| 2020/0226460 A1 | 7/2020 | Bruss | |
| 2020/0236125 A1 | 7/2020 | Wright | |
| 2020/0274894 A1 | 8/2020 | Argoeti | |
| 2021/0075805 A1 | 3/2021 | Cavallari | |
| 2021/0103768 A1 | 4/2021 | Niculescu-mizil et al. | |
| 2021/0194905 A1* | 6/2021 | Fong | H04L 63/1425 |
| 2021/0209229 A1 | 7/2021 | Wu | |
| 2021/0248443 A1* | 8/2021 | Shu | G06F 16/9024 |
| 2021/0279337 A1* | 9/2021 | Mosby | G06F 21/577 |
| 2021/0319329 A1* | 10/2021 | Yang | G06F 16/9024 |
| 2021/0406365 A1* | 12/2021 | Neil | H04L 63/145 |
| 2021/0406917 A1 | 12/2021 | Erickson | |
| 2022/0086179 A1 | 3/2022 | Levin | |
| 2022/0092224 A1* | 3/2022 | Yamada | G06F 16/2365 |
| 2023/0053182 A1 | 2/2023 | Bertiger et al. | |
| 2023/0326012 A1 | 10/2023 | Takla | |
| 2024/0134874 A1* | 4/2024 | Blonski | H04L 67/10 |

OTHER PUBLICATIONS

"Notice of Allowance Issued in U.S. Appl. No. 17/869,437", Mailed Date: Sep. 6, 2023, 5 Pages.

"Non Final Office Action Issued in U.S. Appl. No. 17/869,437", Mailed Date: Mar. 23, 2023, 12 Pages.

Notice of Allowance mailed on Dec. 13, 2023, in U.S. Appl. No. 17/492,439, 11 pages.

Communication under Rule 71(3) Received for European Application No. 22754623.1, mailed on Nov. 15, 2024, 5 pages.

Office Action Received for Indian Application No. 202217034353, mailed on Dec. 2, 2024, 7 Pages.

\* cited by examiner

MALICIOUS ENTERPRISE BEHAVIOR DETECTION TOOL

CROSS-REFERENCE TO RELATED APPLICATIONS

This application is a continuation of U.S. application Ser. No. 16/917,318, filed on Jun. 30, 2020, the entire contents of which is incorporated by reference herein.

BACKGROUND

Generally, companies conduct continuous analysis on behaviors within an enterprise to ensure all operations run properly and thwart potentially malicious tasks. Typically, enterprise and information security teams monitor enterprise behavior signals available from the enterprise using third-parties and/or various tools to monitor enterprise and endpoint behavior to identify malicious behavior. This manual monitoring often requires years of training and experience to recognize and discern actual threats from false-positives. Due to detection deficiencies of these tools, lack of resources, and human error, suspicious behaviors within an enterprise often go undetected. Additionally, because attacker enterprise behavior against an enterprise may be intermittent or mirror normal user activity, signals related to the attack are often analyzed separately, resulting in degraded detection performance versus including them together. As such, conventional approaches for identifying potentially harmful behavior within an enterprise remain deficient, despite requiring intelligent users employing resource intensive tools.

SUMMARY

Various aspects of the technology described herein are generally directed to systems, methods, and computer storage media, for among other things, monitor network and endpoint behavior to identify malicious behavior in an enterprise. In particular, in some embodiments, malicious behaviors may be detected by determining the most suspicious computing behaviors among nodes in a computing environment (e.g., a distributed computing environment). According to one embodiment, a malicious enterprise behaviors detector of a malicious enterprise behavior detection system in the computing environment can identify potentially malicious behaviors within an enterprise by identifying sub-graphs of the enterprise using a greedy searching technique based on risk scores of nodes and edges in the enterprise. The sub-graphs may be output to a graphical user interface as a graph for further analysis or viewing to facilitate mitigation. In another embodiment, the malicious enterprise behaviors detector of the malicious enterprise behavior detection system in the computing environment can identify potentially malicious behaviors within an enterprise by starting at a target node and iteratively crawling to other nodes via edges until meeting a termination condition (e.g., root-cause of a condition). In this manner, embodiments of the present disclosure employ deterministic and probabilistic methods for identifying sub-graphs of potentially malicious behaviors within an enterprise.

According to the operation of one embodiment using a probabilistic technique, nodes and edges of an enterprise are sorted according to their associated risk scores and evaluated starting with the edge or node with the greatest risk score indicating a high likelihood of malicious activity based on heuristics, rules, expert knowledge encodings, supervised machine learning methods, and/or anomaly detection. All reachable nodes and edges from the highest scored edge or node may be evaluated to determine if any combination of nodes and edges results in a lower risk score than the highest scored edge or node. Any combination that has a lower risk score are merged into a new sub-graph and reevaluated using the new sub-graph as the starting point and evaluating all reachable nodes and edges until a fully connected sub-graph identify potentially malicious behaviors is identified and stored. Embodiments may then perform another evaluation based on the next highest risk scored node or edge not connected to any identified sub-graphs. Advantageously, by isolating nodes and edges in a large-scale enterprise for evaluating each one at a time, embodiments perform analysis on behaviors in the enterprise to identify sub-graphs resulting in efficient use of resources on enormous datasets.

In another embodiment, using a deterministic technique, an initial node (i.e., target node) is selected and embodiments traverse to other nodes connected to the initial node via edges that represent behaviors connecting the nodes. Embodiments then traverse to the other connected nodes from the initial node until a termination condition is met. In some instances, the termination condition provides an insight associated with the node. Insights describe the meaning of a node, multiple nodes, and edges connecting nodes based on relationships, functionality, or other characteristics analyzed from the nodes and edges. Embodiments traverse the nodes until the root-cause termination condition is met indicating that the root cause of the potentially malicious activity is found. In this manner, insights associated with nodes may be identified during the traversal such that insights can be gathered to determine whether a certain subgraph or path from the initial node is malicious.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1:
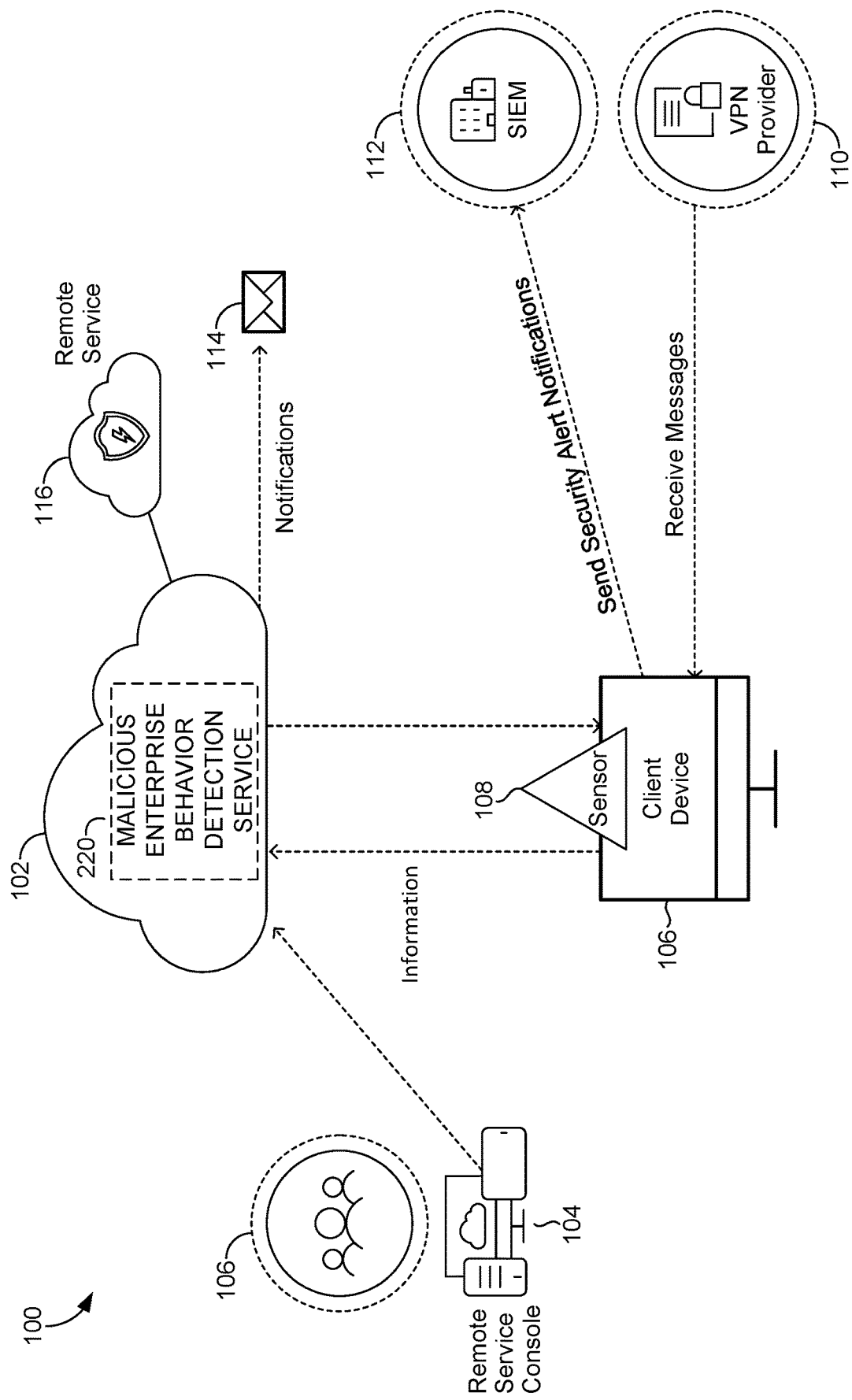
FIG. 1 is a block diagram of an example cloud-based service environment, suitable for use in implementing aspects of the technology described herein.

Overview of Technical Problems, Technical Solutions, and Technological Improvements Generally, real-time analysis of enterprise connections and behaviors to detect unusual activity such as sophisticated cyber-attacks requires extensive manual analysis with the help of enterprise analytics tools. Due to the amount of computer resources required to monitor and analyze enterprise traffic and behaviors, malicious activity is sometimes not detected until after a malicious payload is delivered or the attacker has already gleaned information needed to carry out an attack. While real-time detection and prevention of threat is ideal, the continual evolution of attackers' techniques make it difficult to combat cyber-threats especially when the nefarious enterprise activity may appear normal.

Due to the difficulties in implementing a fool-proof, proactive breach prevention system, post-breach malware and attack detection in an enterprise is a reactive approach that many security and enterprise teams perform as part of their responsibilities. However, even after performing forensic analysis it is not always clear how an attacker was able to traverse through an enterprise due to the significant number of different paths an attacker may take in an enterprise. For example, even a simple enterprise may have 50 machines resulting in billions of possible attack behaviors. As a result, analyzing enterprise and endpoint behavior, user accounts, and web behavior, among other behavior and activity, following an attack allows security and enterprise teams to gain valuable insights into the attack including how the attacker gained entry into the system and the attackers' movements while on the enterprise to prevent future occurrences. By leveraging this analysis, teams may implement defensive mechanisms to prevent the reoccurrence of similar attacks.

Conventionally, some analytics tools use node-based methods for detecting and identifying unusual enterprise behaviors. However, these traditional technologies often deal with nodes in isolation. For example, known technologies do not analyze multiple different nodes at a single time. In particular, these tools may analyze each individual node in a company's enterprise and provide singular nodal information to security and enterprise teams who must piece together each potentially compromised node to determine the relationship amongst all of the potentially affected nodes. Analyzing individual nodes is a time consuming and computationally intensive process and often results in missed relationships between nodes that may indicate malicious activity.

On the other hand, some conventional technologies utilize spectral graphing techniques to compute an entire behavior graph at one time. Still, using spectral graphing methods to compute a large behaviors graph requires enterprise and security teams to parse through a giant graph of behaviors and locate specific nodes that may have been affected by a detected compromise. Calculating behaviors among nodes for a large enterprise may not be useful for identifying particular nodes containing malicious activity and can result in a misunderstanding of the full attack vector used by a threat actor. Additionally, calculating graphs of this magnitude often fails to consider an essential factor: time. For example, an attacker's behaviors may take place over the course of weeks or months. Furthermore, spectral methods require inverting large matrices; a process that is computationally expensive and inefficient resulting in $O(N^2)$ time complexity based on the number of nodes (N). As a result, a behavior that appears to be suspicious activity initially, may go unnoticed as potentially malicious activity if behaviors are dormant until a later time period. Traditional graphing methods are not easily able to consider the amount of time between certain behaviors. As such, computationally intensive graphing methods do not provide a wholesome view or easily digestible information for stakeholders attempting to combat the ever-changing cyberattack landscape.

Embodiments of the present disclosure are directed to improved methods, systems, and computer storage media for detecting malicious behavior in an enterprise based on heuristics, rules, expert knowledge encodings, supervised machine learning methods, and/or anomaly detection. According to embodiments described herein, malicious behaviors may be detected by determining the suspicious behaviors among nodes in a computing environment (e.g., a distributed computing environment). In particular, a malicious enterprise behaviors detector of a malicious enterprise behavior detection system in the computing environment can identify sub-graphs of a suspicious behaviors with an enterprise. In some instances, the identified sub-graphs correspond to malicious activities performed by an unauthorized third-party such as reconnaissance, lateral movement, exfiltration of data, spearphishing attacks, or other internal attack behaviors. By identifying sub-graphs of potentially malicious activity within an environment, embodiments of the present disclosure are able to pin-point dangerous activity in extensive environments with substantial enterprise traffic.

Generally, embodiments of the present disclosure employ probabilistic and deterministic operations to identify sub-graphs of behaviors within an enterprise. In some embodiments, the sub-graphs are identified based on risk scores associated with behaviors in the enterprise. In other embodiments, the sub-graphs are identified based on a traversal of nodes to identify insights associated with the traversed nodes until a root-cause termination condition is met. Some embodiments of the present disclosure employ an unsupervised approach to determine the nodes and edges utilized during an attack to identify specific endpoints and particular behaviors between endpoints that formulated the attack vector of a malicious actor. In other words, given a graph of all enterprise behaviors and the nodes and edges corresponding to endpoints and behaviors, embodiments of the present disclosure identify the sub-graph in which an attack happened by combining the risk scores associated with the nodes and edges of an enterprise. In other cases, embodiments of the present disclosure identify the sub-graph in which an attack happened by traversing nodes and edges of an enterprise until a root-cause condition is met. As a result, precise sub-graphs of entire enterprises can be distinguished from non-malicious activities and represent an easy-to-understand way of identifying malicious behaviors.

Specifically, in some embodiments, each node and edge within an enterprise have an associated risk score that indicate the overall potential that the node and edge correspond to a suspicious or malicious behavior based on heuristics, rules, expert knowledge encodings, supervised machine learning methods, and/or anomaly detection. Some embodiments of the present disclosure combine the scores associated with nodes and edges and sort the scores according to a risk score for each node and edge combination (e.g., p-value using Fisher's scoring technique that is subtracted from one to generate the risk score). Beneficially, these scores take into account many factors that affect the probability that the behavior is malicious including an important factor of time. For example, a malicious enterprise behavior detector can support calculating risk scores for each node and edge connection (e.g., remote file create or RDP connection) within an enterprise. Some embodiments of the present disclosure may employ Fisher's scoring technique to calculate a risk score by subtracting one from a well-calibrated p-value for each node and edge connection which normalizes the scores and enables input into a model. In other embodiments, the risk score may be calculated via rules or heuristics indicating the maliciousness of a relationship among nodes. For example, rules or heuristics created by security researches that identify malicious behavior among nodes may be used in the risk score calculation of the nodes and relationships among nodes to determine the potential maliciousness nodes and edges. In yet other embodiments, a combination of a probability calculation using Fisher's scoring model may be used in addition to or in combination with the rules or heuristics that identify malicious activity to calculate a risk score for nodes and edges. In this manner, embodiments of the present disclosure may calculate risk scores for nodes and edges using any suitable calculation that takes into account factors indicative of malicious activity.

Once the risk scores are sorted into a list, embodiments of the present disclosure employ a greedy search technique to iteratively crawl the list of sorted risk scores starting at the highest scored object (i.e., node or edge) to determine a sub-graph of objects with the highest risk scores. By iteratively comparing scores of node and edge combinations until the risk score is greater than a previously calculated score, a sub-graph of potentially malicious behaviors is identified. Specifically, by computing the scores of neighbors of nodes and edges, embodiments of the present invention operate at O(N) complexity where N is the number of nodes. In other words, the identified sub-graph with a low p-value indicates a high probability of malicious behavior present in the sub-graph. Additionally, in some instances, embodiments of the present disclosure, may determine one or more sub-graphs identifying multiple sub-graphs of behaviors that are potentially malicious. As such, embodiments of the present disclosure are able to efficiently determine specific behaviors in an enterprise that identify attacker activity so a security team (e.g., security operations center (SOC)) can analyze the data to prevent future occurrences of analogous attacks exhibit similar enterprise behavior.

In other embodiments, nodes and edges are traversed until a root-cause condition is met. Initially, a target node is identified to begin traversal. Starting from the identified target node, embodiments of the present disclosure traverse to other nodes connected to the target node via edges. During the traversal of the nodes, embodiments identify insights associated with nodes. Additionally, embodiments may stop traversal at particular nodes and continue to traversing to other nodes via different edges. In some instances, the insights may also serve as a stop condition to halt the traversal. In other instances, traversed edges may also serve as a stop condition to halt the traversal. In this way, embodiments may define a subset of hard stops such as defining a specific node or edge and/or properties of a specific node and edge combination that stops the traversal. Embodiments continue traversing through nodes via edges of a graph until a root-cause condition is met. In some cases, the root-cause condition may be detected using a suitable machine learning model to detect characteristics of node and edges in the graph. In other cases, the root-cause condition may be selected based on the suspected or actual originating cause of an attack. For example, an email phishing campaign may originate from an email application such as Outlook. As such, embodiments may traverse nodes via edges based on relationships until a node representing the email application is reached. Once the root-cause condition is met, embodiments extract a sub-graph of all the traversed nodes based on the insights generated and analyzed during the traversal. Thus, embodiments identify the specific execution path of potentially malicious activity based on the relationships analyzed between nodes. Beneficially, embodiments detect lateral movement of malicious activity by identifying relationships and linking actions between nodes (e.g. moving files from on one node to another target node and the subsequent execution those files on the target node).

Advantageously, embodiments of the present disclosure can efficiently identify and investigate suspicious enterprise behaviors at a large scale. By identifying malicious sub-graphs in an extensive behavior enterprise of a large enterprise, embodiments of the present disclosure pin-point potentially malicious activity within the large enterprise. By employing a probabilistic (e.g., a greedy technique) and a deterministic technique to calculate a sub-graph of nodes and edges in an enterprise, embodiments of the present disclosure are more computationally efficient than traditional spectral graphing methods and analyze many relationships and interactions between nodes. Furthermore, by locating specific subsets of suspicious behaviors in an enterprise, embodiments of the present disclosure detect attacks in the enterprise in real-time, provide critical information about the attack giving responders the quickest route to shutting the attack down or taking other mitigating actions, and providing a concise overview so security and enterprise teams can investigation malicious enterprise activity to avoid future harm.

Having briefly described an overview of aspects of the present disclosure, various terms used throughout this description are provided. Although more details regarding various terms are provided throughout this description, general descriptions of some terms are included below to provide a clear understanding of ideas disclosed herein:

Nodes generally refer to any entity or subject that may be defined in relation to a cloud, hybrid cloud, and/or on-premise enterprise environment. Nodes may include, but are not limited to, workstations, servers, cloud virtual machines, services, processes executing on an operating system, files, and users, among others.

An edge generally refers to any observable or inferred relationship between two nodes. Observable edges include, but are not limited to, enterprise behaviors, parent-child process calls, user authentications to machines and cloud services, and emails, among others. Inferred edges include, but are not limited to, file similarity, user similarity, and application similarity, among other similarities. Generally, behavioral similarity between two nodes can be determined by a time series of vectors of node attributes, plus a distance metric defined on these time series, to quantify edge similarity.

A risk score generally refers to a score associated with a node or edge that is indicative of malicious activity. As used herein, a risk score may be calculated based on numerous attributes, factors, features, or the like that indicate or provide indications that behavior between nodes and edges are malicious or suspicious. For example, embodiments of the present disclosure may calculate a risk score based on heuristics, rules, expert knowledge encodings, supervised machine learning methods, and/or anomaly detection.

An insight generally refers to a rule or description that highlights the meaning of one or more nodes, one or more edges, or any combination thereof. For example, a node representing an OUTLOOK.EXE may have an associated insight labeled "Email Application." As another example, a node labeled attacker-domain.com may have an associated insight labeled "suspicious downloaded archive" based on the relationships of other connected nodes via edges. As another example, ASEP (Auto-Start Extensibility Points) may be in insight for nodes or edges that relate to a scheduled task.

Overview of Example Environments for Detecting Malicious Enterprise Behaviors

Aspects of the technical solution can be described by way of examples and with reference to FIG. 1 and additional illustrations below. FIG. 1 illustrates a block diagram of an example cloud-based service environment suitable for use in implementing embodiments of the present disclosure. Generally, environment 100 is suitable for identifying potentially malicious behaviors within an enterprise by identifying sub-graphs of the enterprise using a greedy searching technique based on risk scores of nodes and edges in the enterprise. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 10.

It should be understood that operating environment 100 shown in FIG. 1 is an example of one suitable operating environment. Cloud-based service environment generally contains cloud-based service 102 (e.g., Microsoft Advanced Threat Protection (ATP)) which contains malicious enterprise behavior detection service 220. At a high level, cloud-based service 102 monitors client device 106 by capturing and parsing information such as enterprise traffic and leveraging events logged from the device. Cloud-based service 102 may analyze the received data to perform operations such as attack and threat detection. For example, malicious enterprise behavior detection service 220 residing in cloud-based service 102 may employ a greedy search operation to identify sub-graphs of behaviors within an enterprise based on probabilities of risk scores associated with behaviors in the enterprise.

As shown, cloud-based service 102 may be connected to a remote service console 104 (e.g., Microsoft Azure ATP Portal) that enables monitoring, management, and investigation of data captured by cloud-based service 102. For example, remote service console 104 allows integration of cloud-based service 102 with other services, management of configuration setting for sensor 108, viewing data received from cloud-based service 102, and enabling monitoring of detected suspicious activities and suspected attacks based on an attack kill chain model.

To assist in the collection of information from client device 106, sensor 108 may be installed directly on client device 106 to perform operations such as monitoring device traffic, configuration of port mirroring, or gathering other information. For example, sensor 108 may read and/or collect locally, without requiring additional hardware or configurations. Sensor 108 also supports event tracing which provides the log information for multiple detections. As one example, event tracing-based detections include suspected DCShadow attacks attempting to use device replication requests and device promotion.

Client device 106 may communicate information with security information and event management entity 112. Security information and event management entity 112 may perform such functions such as providing real-time analysis of security alerts generated by applications and enterprise hardware such as client device 106. Additionally, client device 106 may receive messages from VPN provider 110. For example, client device 106 may receive RADIUS accounting messages that detail user login session. These messages may be sent when a user (including a remote user) logs into a VPN and logs off. Alternatively, these messages may be send periodically during a user's session.

Cloud-based service 102 may send notifications 114 to multiple entities or users. For example, notification 114 may be an email to a security analyst of an enterprise security team providing information analyzed by malicious enterprise behavior detection service 220. Alternatively, behavior of the information in notification 112 may be also be viewed by remote service console 104. As such, cloud-based service 102 can notify multiple entities or individuals at a single time to convey analyzed information such as suspicious enterprise behaviors detected by malicious enterprise behavior detection service 220.

Additionally, cloud-based service 102 may be connected to remote service 116. As shown, remote service 116 may be cloud-based and may receive information from cloud-based service 102 and send information to cloud-based service 102. Alternatively, remote service 116 may be a standalone platform. For example, remote service 116 may deploy Microsoft® Defender Advanced Threat Protection (ATP) designed to enable enterprise enterprises to prevent, detect, investigate, and respond to advanced threats. As such, remote service 116 may use information gathered by cloud-based service 102 to perform endpoint behavioral analysis, perform cloud security analytics, and analyze other threat intelligence. For example, sensors may be utilized by remote service 116 to collect and process behavioral signals from the operating system of a computer. As another example, remote service 116 may leverage intelligence and other data generated by hunters, security teams, and other individuals or entities to enable identification of attacker tools, techniques, and procedures, and generate alerts when these are observed. In embodiments, malicious enterprise behavior detection service 220 may utilize information gathered by remote service 116. In other embodiments, malicious enterprise behavior detection service 220 may utilize a combination of information gathered, collected, or analyzed by remote service 116 and information (e.g., enterprise network traffic) gathered form sensor 108 on client device 106.

Figure 2:
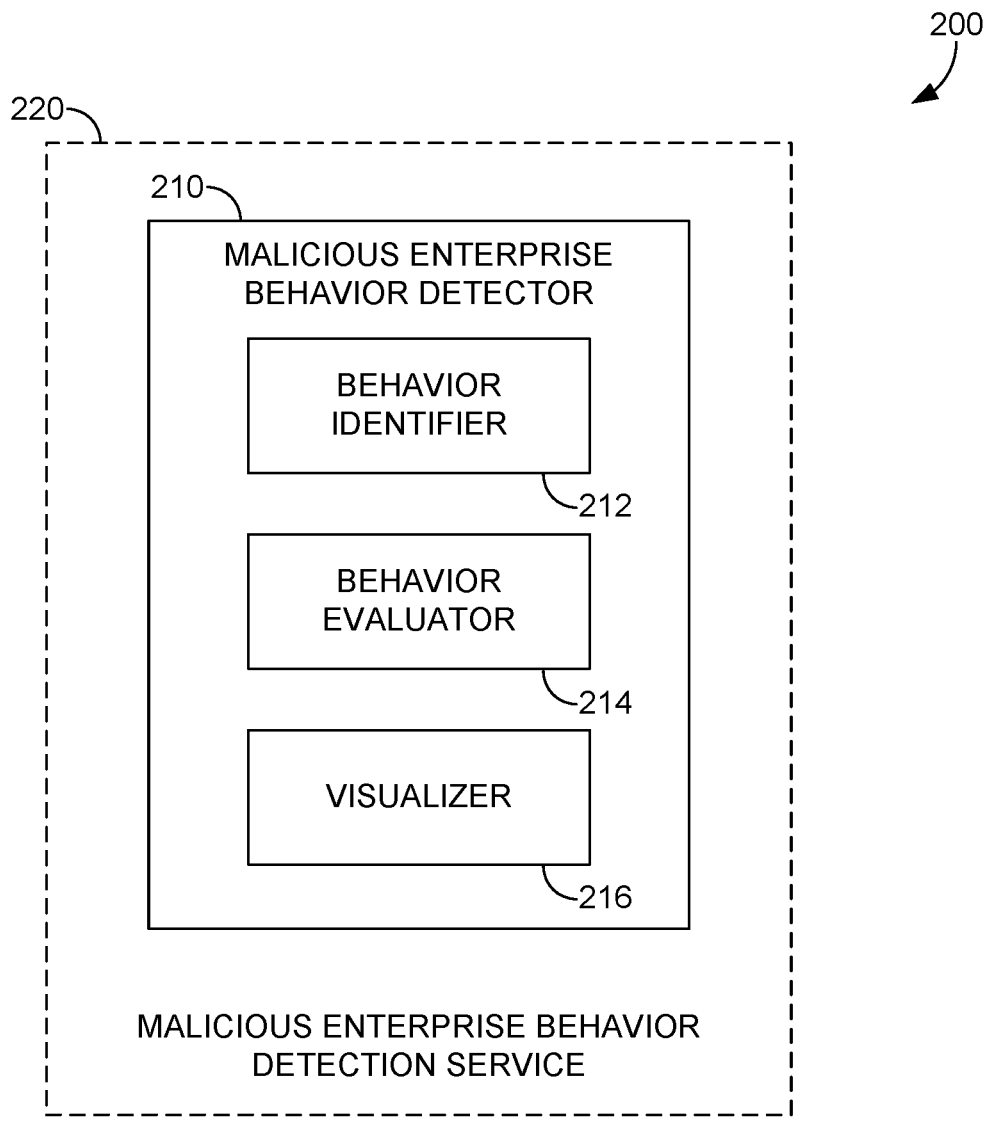
FIG. 2 is a block diagram of an example malicious enterprise behavior detection architecture for detecting suspicious enterprise behaviors using an malicious enterprise behaviors detector, suitable for use in implementing aspects of the technology described herein.

Referring to FIG. 2, a block diagram is provided showing an exemplary technical solution architecture (malicious enterprise behaviors detection architecture 200) suitable for use in implementing embodiments of the technical solution. Generally, the technical solution architecture includes a technical solution system suitable for providing a malicious enterprise behavior detection service based on a malicious enterprise behaviors detector. As shown, FIG. 2 discloses a malicious enterprise behavior detection architecture 200, malicious enterprise behavior detection service 220, malicious enterprise behaviors detector 210 having behaviors identifier 212, a behaviors evaluator 214, and visualizer 216.

In embodiments, malicious enterprise behavior detection service 220 may be deployed in cloud-based service 102 as discussed in conjunction with at least FIG. 1. Alternatively, malicious behavior detection service may be implemented into any suitable computing device or computing environment such as client device 980 or described in conjunction with at least FIG. 9 and computing device 1000 described in conjunction with at least FIG. 10. In embodiments, malicious enterprise behavior detection service 220 contain a malicious enterprise behaviors detector 210 utilized to identify suspicious behaviors within an enterprise that correspond to an attacker within the enterprise. Although not shown for clarity, malicious enterprise behaviors detector 210 can store computer instructions (e.g., software program instructions, routines, or services), data, and/or models used in embodiments described herein.

As an overview, malicious enterprise behaviors detector 210 utilizes components 212, 214, and/or 216 and/or a combination thereof to implement the method described below in conjunction with at least FIGS. 3 and 6A-6B. Behaviors identifier 212 may identify connections between nodes in an enterprise and perform initial analysis on the connections and nodes. In some embodiments, the connections and nodes are arranged in a list according to their associated risk scores. In other embodiments, the connections and nodes are arranged in any suitable way that preserves relationships between the connections and nodes.

In one embodiments behaviors evaluator 214 may iteratively crawl the list of identified edges and nodes starting with the edge or node with the highest risk score and examining the reachable nodes and edges connected to the highest scored node or edge to identify a sub-graph of nodes and edges with a lower risk score than the highest scored edge or node. Once the sub-graph is identified, the sub-graph is merged with the first identified node or edge to produce a new sub-graph. Embodiments then repeat the process using the new sub-graph as a starting point to identify reachable nodes and edges to identify another new sub-graph that has a higher risk probability score. Once all reachable nodes and edges are evaluated, embodiments store the sub-graph. In this embodiment, visualizer 216 may then output a stored sub-graph generated by behavior emulator 214 onto a graph that clearly identifies the sub-graphs of potentially malicious behaviors.

In another embodiment, behavior evaluator 214 traverses the nodes and connections until a root-cause condition is met. Initially, a target node is identified and embodiments traverse to all other connected nodes generating insights as the nodes and connections are traversed. Embodiments are able to traverse by analyzing each node connected via edges. Embodiments traverse through relationships between nodes until a root-cause condition or another stop condition is met. Once the root-cause condition has been satisfied, embodiments generate a sub-graph of connected nodes based on the insights associated with one or more nodes and edges in the sub-graph. Although not shown for clarity, embodiments may cause a security risk mitigation action based on the identified sub-graph.

In this way, to initiate identifying the sub-graphs of potentially malicious behaviors, behaviors identifier 212 identifies enterprise objects including edges and nodes within an enterprise may be identified. For example, behaviors identifier 212 may analyze behaviors within an enterprise between nodes. Behaviors between nodes are referred to as connections or edges. These behaviors can include any transmission of information between nodes and can follow any behavior protocol (e.g., communication protocol). As one non-limiting example, behaviors between two nodes could be a remote file create communication or a remote desktop protocol (RDP) connection. As another non-limiting example, a node may be a process performing some activity on another node such as a file. In this instance, the edge on a graph would demonstrate the relationship between the process and the file. As such, behaviors identifier 212 is able to identify relationships between nodes via edges.

As contemplated in the present disclosure, each edge and node in an enterprise may have an associated risk score. This risk score indicates a likelihood that the edge or node associated with the score is likely to be malicious. It is contemplated that embodiments of the present invention may use any suitable model to calculate the risk score for each node or edge. For example, embodiments may use Fisher's scoring model to calculate a p-value for each node and edge. Because the p-value is a measure of the probability that the behavior is normal, the associated risk score may be calculated by subtracting the p-value from one. This calculated value indicates the risk score for each node and edge in the enterprise and can be used by behaviors evaluator 214. In some embodiments, the risk score may be calculated via rules or heuristics indicating the maliciousness of a relationship among nodes. For example, rules or heuristics created by security researches that identify malicious behavior among nodes may be used in the risk score calculation of the nodes and relationships among nodes to determine the potential maliciousness nodes and edges. In yet other embodiments, a combination of a probability calculation using Fisher's scoring model may be used in addition to or in combination with the rules or heuristics that identify malicious activity to calculate a risk score for nodes and edges. In this manner, embodiments of the present disclosure may calculate risk scores for nodes and edges using any suitable calculation that takes into account factors indicative of malicious activity.

Behaviors evaluator 214 of malicious enterprise behaviors detector 210 is generally configured to evaluate the nodes and edges within an enterprise using a greedy technique described in more detail below in conjunction with at least FIG. 3 or, in other embodiments, using a deterministic method described in more detail below in conjunction with at least FIGS. 6A-6B and 8. In one embodiment, behaviors evaluator 214 initially takes the edge or node with the highest risk score to form a first sub-graph. Embodiments iterate though all nodes and edges connected to the first sub-graph and examine the most improbable (i.e., nodes and edges with the highest risk scores) reachable nodes and edges. Embodiments then calculate a proposed risk score by combining the risk score of a proposed node, edge, or combination thereof with the first sub-graph. Based on whether the proposed risk score is greater than or greater than the risk score of the first sub-graph, embodiments will either store the first sub-graph or merge the proposed node, edge, or combination thereof into the first sub-graph to form a new sub-graph. Embodiments then repeat the process using the new sub-graph as the initial starting point of the analysis and checking all of its reachable nodes and edges. Embodiments may then proceed until a node or edge is found that does not decrease the risk score of the sub-graph. The last sub-graph analyzed is then stored and the next most improbable enterprise object not connected to any existing analyzed sub-graph is analyzed in the same manner as above to identify an additional new sub-graph indicating potentially malicious behaviors.

In another embodiment, behaviors evaluator 214 initially identifies a target node to begin traversing to other connected nodes via edges. As used herein, traversal generally means to travelling to, accessing, processing, visiting, or otherwise analyzing each node contained in any suitable data structure (e.g., vector, linked list, tree, or the like) capable of storing nodes connected to other nodes via edges. Starting from the identified target node, embodiments of the present disclosure traverse to other nodes connected to the target node via edges. During the traversal of the nodes, embodiments generate insights associated with nodes. Additionally, embodiments may stop traversal at particular nodes and continue to traversing to other nodes via different edges. In some instances, the insights may also serve as a stop condition to halt the traversal. In other instances, traversed edges may also serve as a stop condition to halt the traversal. In this way, embodiments may define a subset of hard stops such as defining a specific node or edge and/or properties of a specific node and edge combination that stops the traversal.

In this instance, embodiments continue traversing through nodes via edges of a graph until a root-cause condition is met. In some cases, the root-cause condition may be detected using a suitable machine learning model to detect characteristics of node and edges in the graph. In other cases, the root-cause condition may be selected based on the suspected or actual originating cause of an attack. For example, an email phishing campaign may originate from an email application such as Outlook. As such, embodiments may traverse nodes via edges based on relationships until a node representing the email application is reached. Once the root-cause condition is met, embodiments extract a sub-graph of all the traversed nodes based on the insights generated and analyzed during the traversal. In some embodiments, the extracted sub-graph may be an initial target node and analyzed to discover other potentially malicious activity originating from the sub-graph. Thus, embodiments identify the specific execution path of potentially malicious activity based on the relationships analyzed between nodes.

Visualizer 216 of malicious enterprise behaviors detector 210 is generally configured to output sub-graphs generated and stored by behaviors evaluator 214. It is contemplated that visualizer 216 may generate a graph as described below in conjunction with FIG. 5. The graph may be generated for display on a graphical user interface, for example. Alternatively, it is contemplated that visualizer 216 may output sub-graphs in any suitable way and include any information related to the outputted sub-graph. For example, visualizer 216 may output detailed information regarding specific information of each node or edge identified in the sub-graph and provide a visual representation the information in the form of a table. As such, visualizer 216 supplements or aids to produce a visually appealing display, for presenting on a graphical user interface, of the information analyzed by behaviors identifier 212 and/or behaviors evaluator 214. Although not shown for clarity, malicious enterprise behaviors detector 210 may also cause a security risk mitigation action such as, but not limited to, deleting or purging malware from a system, stopping a connection to a potentially malicious link, or preventing a particular process from running.

Example Methods for Malicious Behaviors Detection

With reference to FIGS. 3-8, flow diagrams and example graphs are provided illustrating methods for providing malicious activity management based on malicious activity management operations. The methods may be performed using the malicious activity management environment described herein. In embodiments, one or more computer storage media having computer-executable instructions embodied thereon that, when executed, by one or more processors can cause the one or more processors to perform the methods in the storage system.

Figure 3:
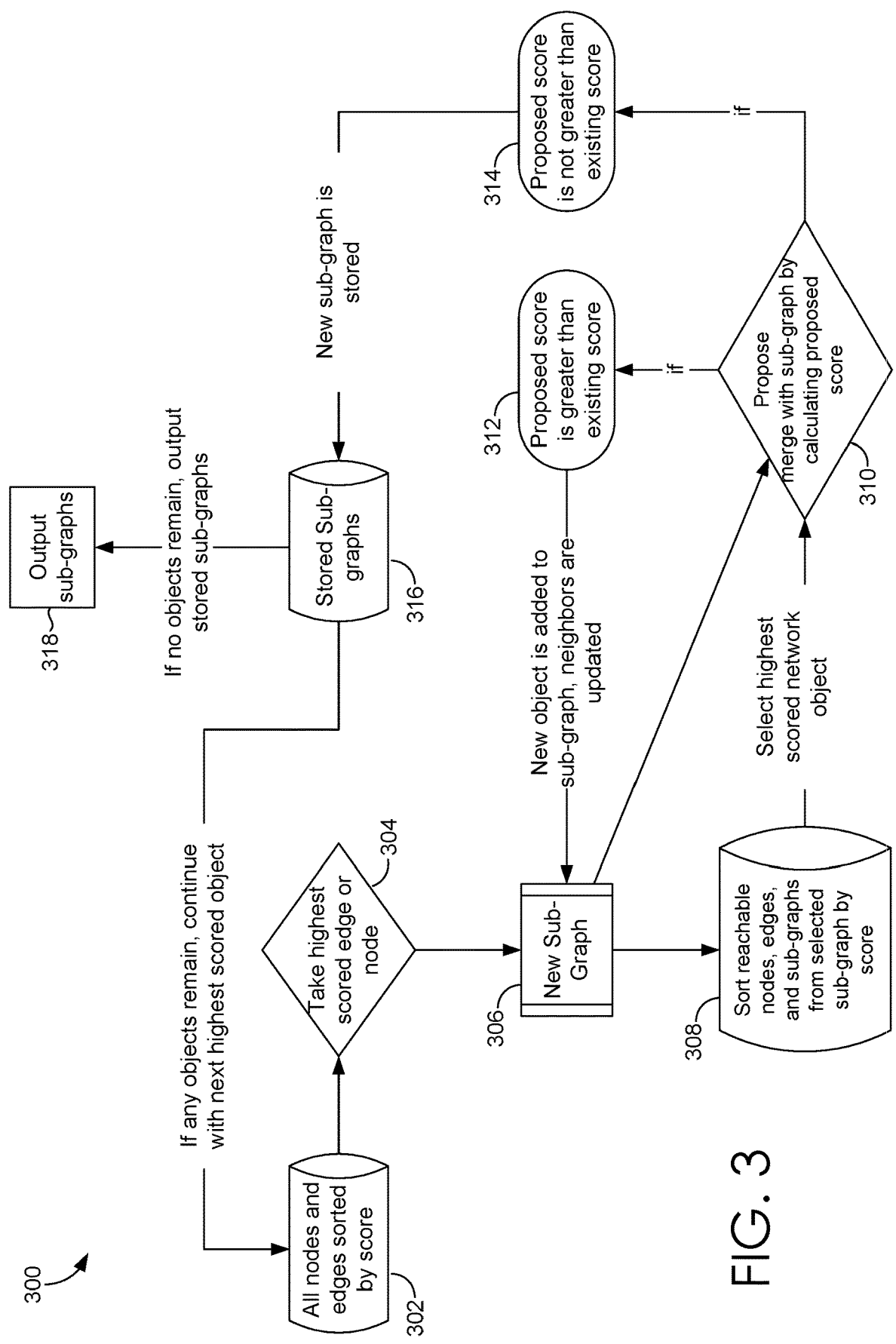
FIG. 3 is a flow diagram providing a first example method of detecting malicious enterprise behaviors, in accordance with aspects of the technology described herein.

Turning to FIG. 3, a flow diagram is provided that illustrates a method 300 for detecting malicious behaviors in an enterprise. Generally, the flow diagram of FIG. 3 can be implemented using the architecture described above at least in conjunction with FIGS. 1 and 2. For example, any suitable combination of portions of method 300 may be implemented into various components of malicious enterprise behaviors detector 210 such that potentially malicious behaviors within an enterprise are identified by recognizing sub-graphs of the enterprise using a greedy searching technique based on risk scores of nodes and edges in the enterprise.

Figure 4:
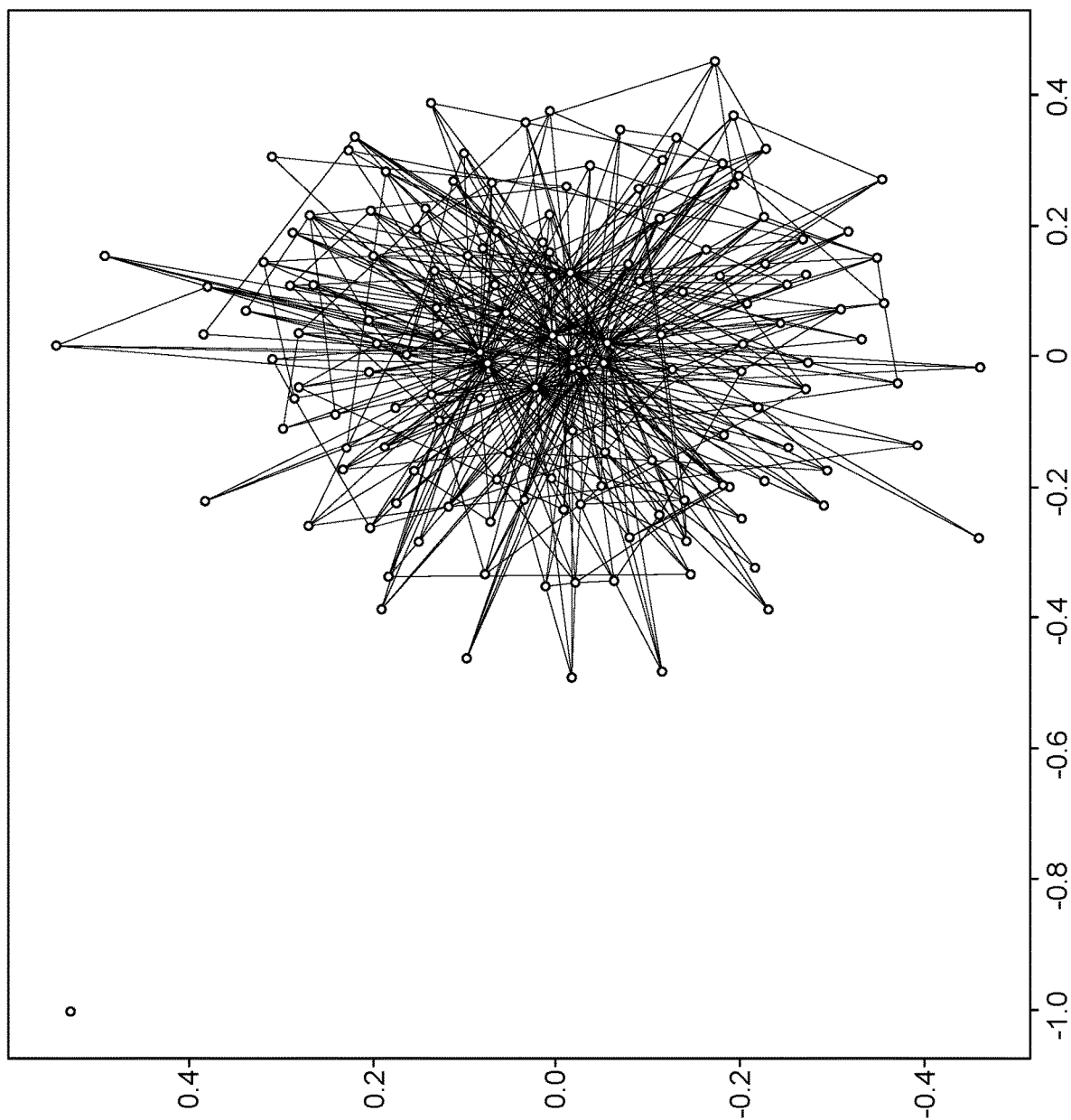
FIG. 4 is an example graph illustrating enterprise behaviors sorted according to risk scores, in accordance with aspects of the technology described herein.

Initially, method 300 at block 302 requires all enterprise objects, such as nodes and edges, within an enterprise to be scored by embodiments of the present disclosure. For example, as shown in FIG. 4, an illustrative visualization corresponding to an enterprise with a plurality of nodes having a plurality of behaviors between the nodes in the enterprise is arranged by probability between the connections. These behaviors connecting machines and nodes are referred to as edges. Visually, nodes may be represented as points on the graph (e.g., open points) on a graph and edges representing behaviors between nodes may be represented as lines connecting two points. In embodiments, the nodes and edges may be stored in a data structure (e.g., list, vector, etc.). Accordingly, each data structure comprised of nodes and edges can be sorted based on their associated risk scores.

Once all nodes and edges of an enterprise are sorted according to their corresponding risk score at block 302, embodiments of the present disclosure select the edge or node with the highest risk score at block 304 to form a new sub-graph at block 306. Initially, the sub-graph at block 306 may only contain a single node or edge. At block 308, embodiments of the present disclosure sort the reachable nodes, edges, and sub-graphs connected to new sub-graph formed at block 306 by their corresponding risk score. Reachable nodes, edges, and sub-graphs include any node, edge, or combination thereof (e.g., sub-graph) that is can be reached via another node, edge, and/or sub-graph. In other words, embodiments of the present disclosure search for all enterprise objects connected to the sub-graph formed at block 306. For example, the sub-graph formed at block 306 may be able to reach another node having the highest probability through a series of edges connected to other nodes. After the reachable nodes, edges, and sub-graphs are sorted according to their corresponding risk scores at block 308, embodiments of the present disclosure select the highest risk probability reachable enterprise object(s) such as nodes, edges, sub-graph or combination thereof.

At block 310, embodiments of the present disclosure propose a merge with the selected highest scored reachable enterprise object and the sub-graph formed block 306 by calculating the risk score of proposed merged sub-graph. In other words, embodiments of the present disclosure combine the risk score of the sub-graph formed at block 306 with the risk score of the enterprise object selected at block 308 to form a proposed risk score. Based on the proposed risk score, embodiments of the present disclosure determine whether the proposed risk score is greater than the risk score associated with the sub-graph at block 306. If the proposed risk score is greater than the risk score of the sub-graph formed at block 306 as indicated at block 312, embodiments of the present disclosure join and/or merge the proposed enterprise object into the sub-graph formed at block 306. The newly formed enterprise object is merged into the sub-graph and its neighbors are updated so that at block 306 embodiments of the present disclosure can repeat the process using the newly formed enterprise object for block 306 to block 310. Additionally, embodiments of the present disclosure track the enterprise objects that are reachable from the previous sub-graph the newly formed sub-graph so that the previous reachable nodes are not revisited when iterating through the reachable enterprise objects of the newly formed sub-graph.

As such, embodiments of the present disclosure repeat blocks 306 to 310 until the proposed risk score of an enterprise object does not increase the risk score. If the proposed risk score is not greater than the risk score of the sub-graph formed at block 306 as indicated at block 314, embodiments of the present disclosure store the sub-graph from block 306 into a data store at block 316. Once the sub-graph is saved at block 316, embodiments of the present disclosure repeat blocks 302 to 316 until no enterprise objects remain.

Figure 5:
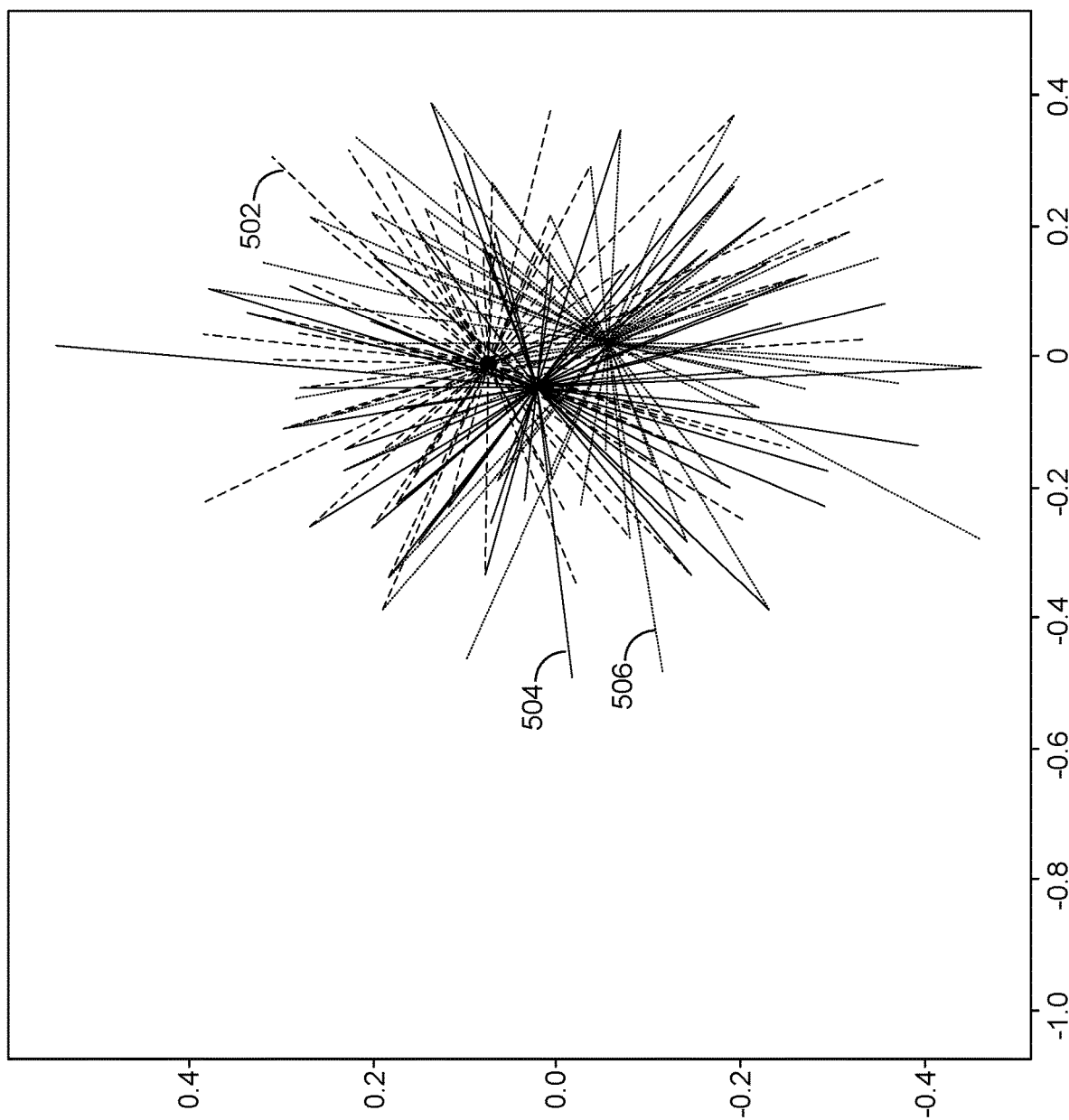
FIG. 5 is an example graph illustrating sub-graphs of malicious enterprise behaviors identified from the example graph in FIG. 4, in accordance with aspects of the technology described herein.

At block 318, the stored sub-graphs from block 316 may be communicated or outputted to a user interface. For example, turning now to FIG. 5, FIG. 5 shows an example graph illustrating sub-graphs of malicious enterprise behaviors identified from the example graph in FIG. 4. As shown, embodiments of the present disclosure identified three sub-graphs of potentially malicious behaviors within the graph of FIG. 4. Behaviors (e.g., edges) between each sub-graph are shown based on a different style line drawing. For example, behaviors among nodes in sub-graph 502 are shown by dashed lines, behaviors among nodes in sub-graph 504 is shown by solid lines, and behaviors among nodes in sub-graph 506 is shown by dotted lines. Alternatively, the stored-subgraphs from block 316 may be used to perform a security mitigation operation such as, but not limited to, blocking a particular IP address, deleting or removing malware, stopping execution of malware, and other activity related to stopping or preventing malware. Advantageously, by identifying sub-graphs of larger enterprises, embodiments of the present disclosure identify specific nodes and edges that correspond to potentially malicious behaviors.

Figure 6A:
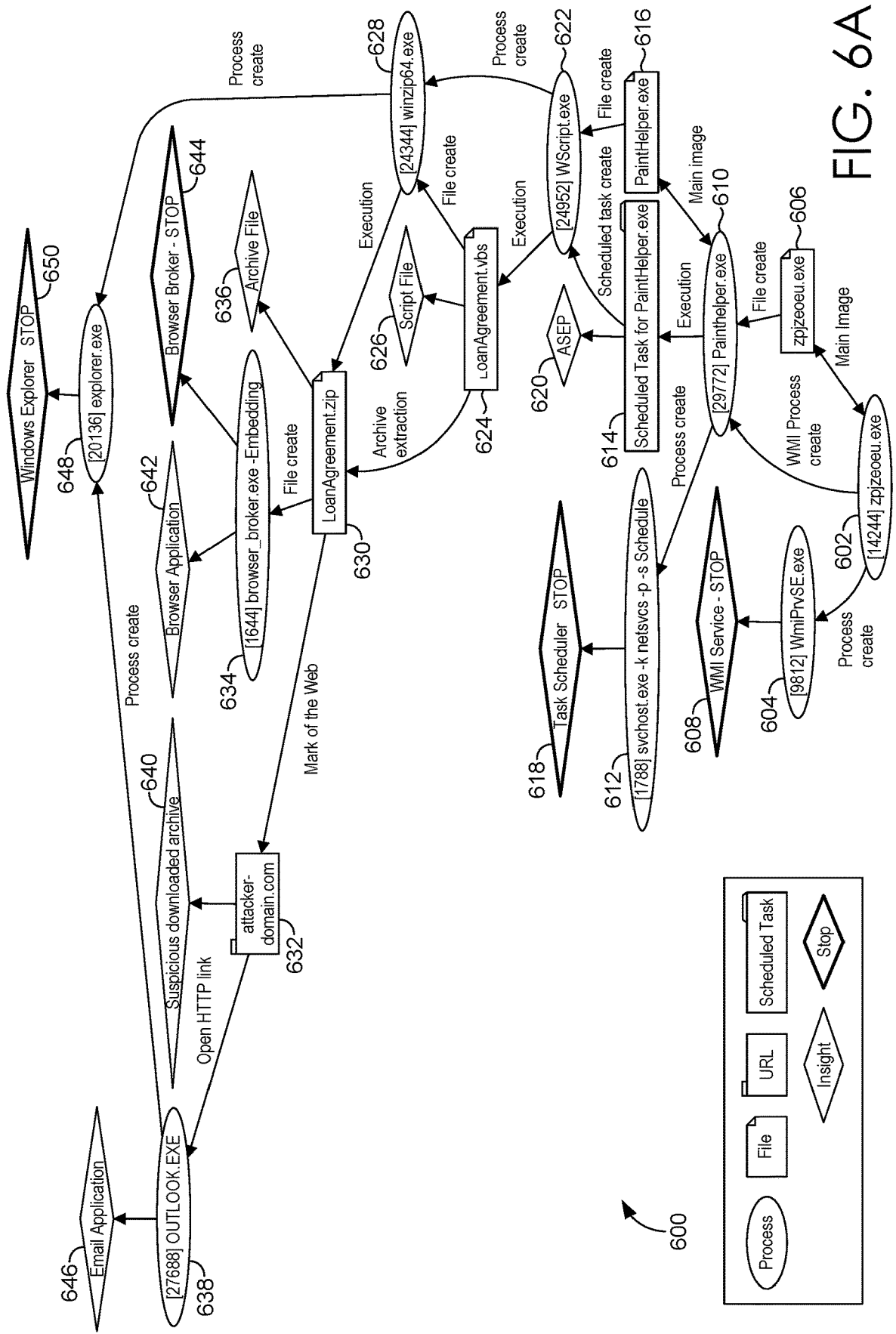
FIG. 6A is an example graph illustrating a method for traversing nodes and edges, in accordance with aspects of the technology described herein.

Referring now to FIG. 6A, FIG. 6A is an example graph illustrating a method for traversing nodes and edges, in accordance with aspects of the technology described herein. As used herein, traversal generally means to travelling to, accessing, processing, visiting, or otherwise analyzing each node contained in any suitable data structure (e.g., vector, linked list, tree, or the like) capable of storing nodes connected to other nodes via edges. Generally, the method described below in conjunction with FIG. 6A can be implemented using the architecture described above at least in conjunction with FIGS. 1 and 2. For example, any suitable combination of portions of the method may be implemented into various components of malicious enterprise behaviors detector 210 such that potentially malicious behaviors within an enterprise are identified by recognizing sub-graphs of the enterprise using a deterministic traversal technique based on insights associated with nodes and a root-cause condition that signals termination of the traversal. Although not shown for clarity, it is contemplated that the graph 600 may be stored using any suitable data structure capable of maintaining connections among nodes via edges. The graph 600 is shown as a means of demonstrating how nodes are traversed via edges until a root-cause condition is met. As shown, the graph 600 is comprised of multiple nodes and edges connected to initial target node 602. As one example, the nodes in graph 600 may be processes, files, URLs, or the like that are connected to other nodes via relationships (e.g., process create, opening a link, creating a file, etc.) shown as arrows. In some instances, nodes may have multiple arrows to other nodes indicating multiple relationships. As such, embodiments may traverse to any other node connected via an arrow.

Initially, embodiments may select initial node 602 to begin traversing graph 600 based on a heuristic that indicates that activity or relationships associated with the initial node may be potentially malicious. In other instances, embodiments may select initial node 602 based on another indicator of compromise. In this way, embodiments start traversal from initial node 602 by traversing to other nodes connected via edges. For example, embodiments may traverse to nodes 604, 606, or 610. At each node, embodiments analyze the node to determine whether to continue traversing form that node and whether an insight may be generated and associated with the node. For example, node 604 has an associated insight 608 indicating that node 604 is a particular type of service. In some instances, insights may also be stop conditions indicating that embodiments stop traversal at the node and proceed from the previously traversed node. For example, insight 608 may also be a stop condition. Once a stop condition is reached, embodiments continue traversing from the previous node (i.e., the traversal begins form the last node that did not have a stop condition associated with it and that is connected to other nodes) to other reachable nodes.

Embodiments will continue to traverse to nodes and analyze insights 610-646 in the manner described above until a root-cause condition is met. The root-cause condition may be any condition that indicates how the potentially malicious attack originated. In some instances, the root-cause condition may be selected manually or automatically based on known originating attack vectors on certain entities. For example, embodiments may employ a machine learning model to calculate the various nodes and edges and determine a root-cause condition. In other instances, the root-cause condition may be identified as a particular application or entity that is known to be an originating node for malicious activity (e.g., email application for spearphishing attacks). Once a root-cause condition is identified, embodiments stop traversing and the graph 600 generated therefrom indicates the execution path of potentially malicious activity. For example, a root cause condition may be node 638 with associated insight 646 indicating that the process executed at node 638 is an email application that may be the root-cause of potentially malicious activity associated with other nodes connected from initial node 602. In this way, embodiments use a deterministic technique to reach all nodes connected to initial node 602 to identify graph 600 indicating potentially malicious activity by analyzing the relationships defined between nodes.

Figure 6B:
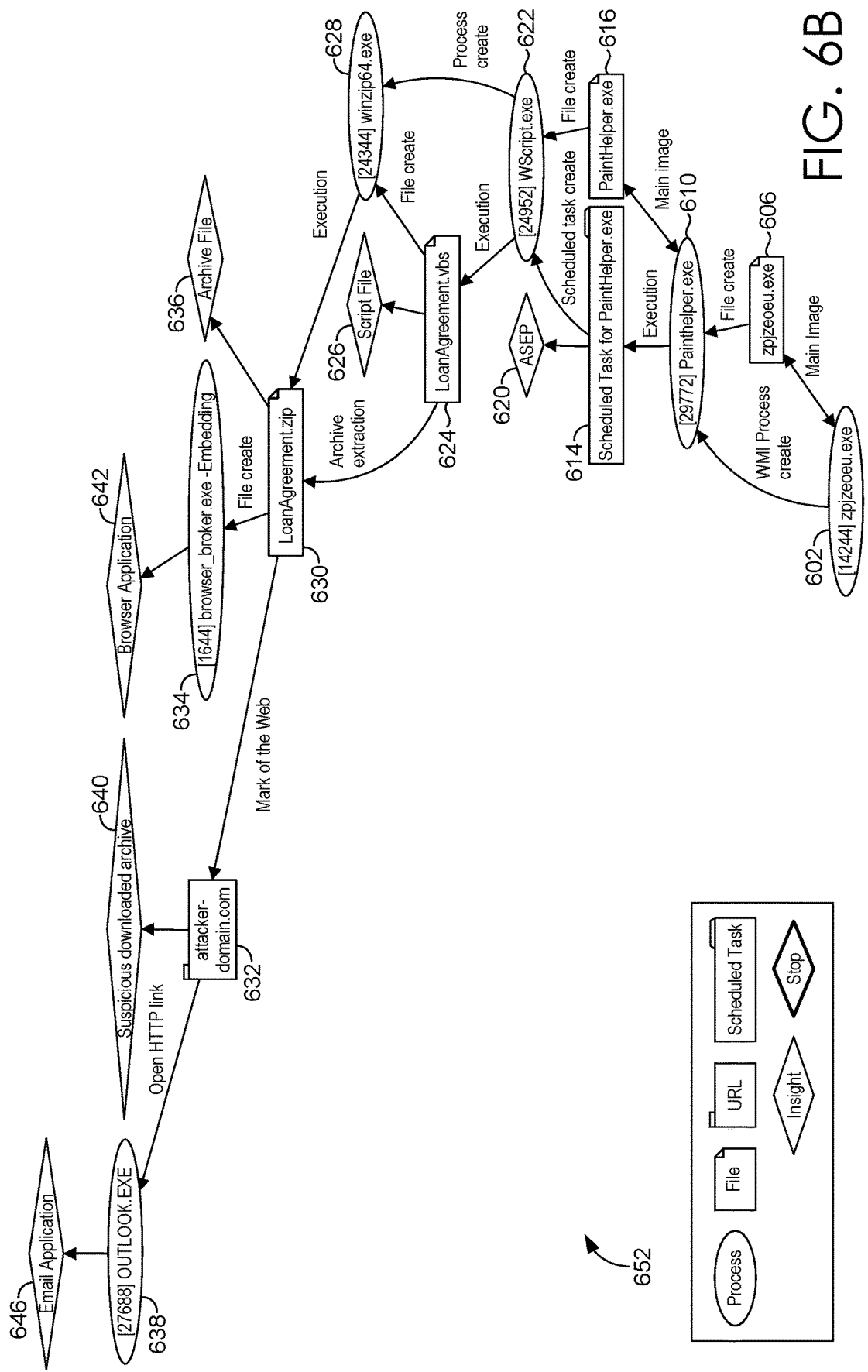
FIG. 6B is an example graph illustrating an identified sub-graph associated with malicious enterprise behavior detected from the graph in FIG. 6A, in accordance with aspects of the technology described herein.

Referring now to FIG. 6B, FIG. 6B is an example illustrating an identified sub-graph associated with malicious enterprise behavior detected from the graph in FIG. 6A, in accordance with aspects of the technology described herein. As shown, the nodes and insights 602-646 shown in FIG. 6B represent identified sub-graph 652 of malicious activity. Although not shown for clarity, embodiments identify the sub-graph 652 based on insights associated with nodes (e.g., insights 620, 626, 636, 640, 642, and 646). For example, nodes and insights that are determined not to be indicators of compromise or otherwise associated with the execution of malicious behavior based on relationships to other nodes are not part of the sub-graph (e.g., node 604 and insights 608 from graph 600 of FIG. 6A). Based on an analysis of the insights, all connected nodes to the initial node are identified that represent the path of relationships among connected nodes until the root-cause condition is met. For example, the identified sub-graph 652 in FIG. 6B represents the execution path of a particular spearphishing attack.

Figure 7:
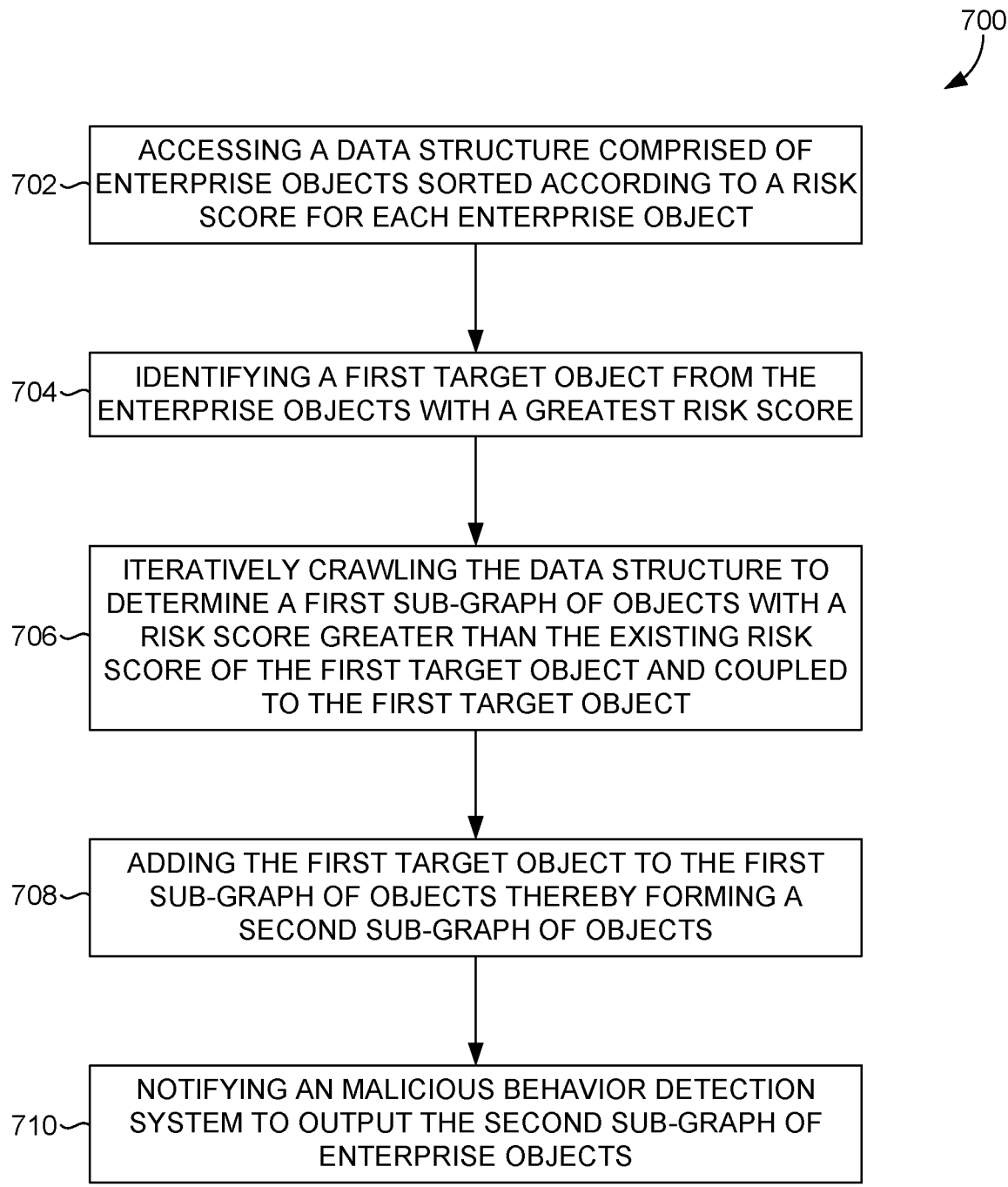
FIG. 7 is flow diagram providing an example method of detecting malicious enterprise behaviors, in accordance with aspects of the technology described herein.

Referring now to FIG. 7, FIG. 7 shows a flow diagram providing an example method of detecting malicious enterprise behaviors, in accordance with aspects of the technology described herein. Initially, at step 702, a data structure comprised of enterprise objects sorted according to a risk score for each enterprise object is accessed. Although not shown for clarity, the enterprise objects are comprised of a plurality of nodes, wherein each node of the plurality of nodes is connected to another node via an edge. At step 704, a first target object from the enterprise objects with a greatest risk probability score is identified. Although not shown for clarity, identifying the first target object further comprises at least one of: 1) identifying a first edge with a greatest risk score; or 2) identifying a first node with a greatest risk score. At step 706, the data structure is iteratively crawled to determine a first sub-graph of objects with a risk probability score greater than the existing risk score of the first target object. The first sub-graph of objects being coupled to the first target object. Although not shown for clarity, iteratively crawling the data structure to determine the first sub-graph of objects further comprises identifying each connected object to the first target object, each connected object having an associated risk score, and selecting a highest risk score of the connected objects to the first target object. At step 708, the first target object is added to the first sub-graph of objects thereby forming a second sub-graph of objects. Lastly, at step 710, an anomaly detection system is notified to output the second sub-graph of enterprise objects. Although not shown for clarity, in embodiments, a second target object from the enterprise objects with a risk score greater than the risk score of the first object may be identified and the data structure may be iteratively crawled to determine a third sub-graph of objects coupled to the second target object with a risk score greater than the existing risk score of the second target object.

Figure 8:
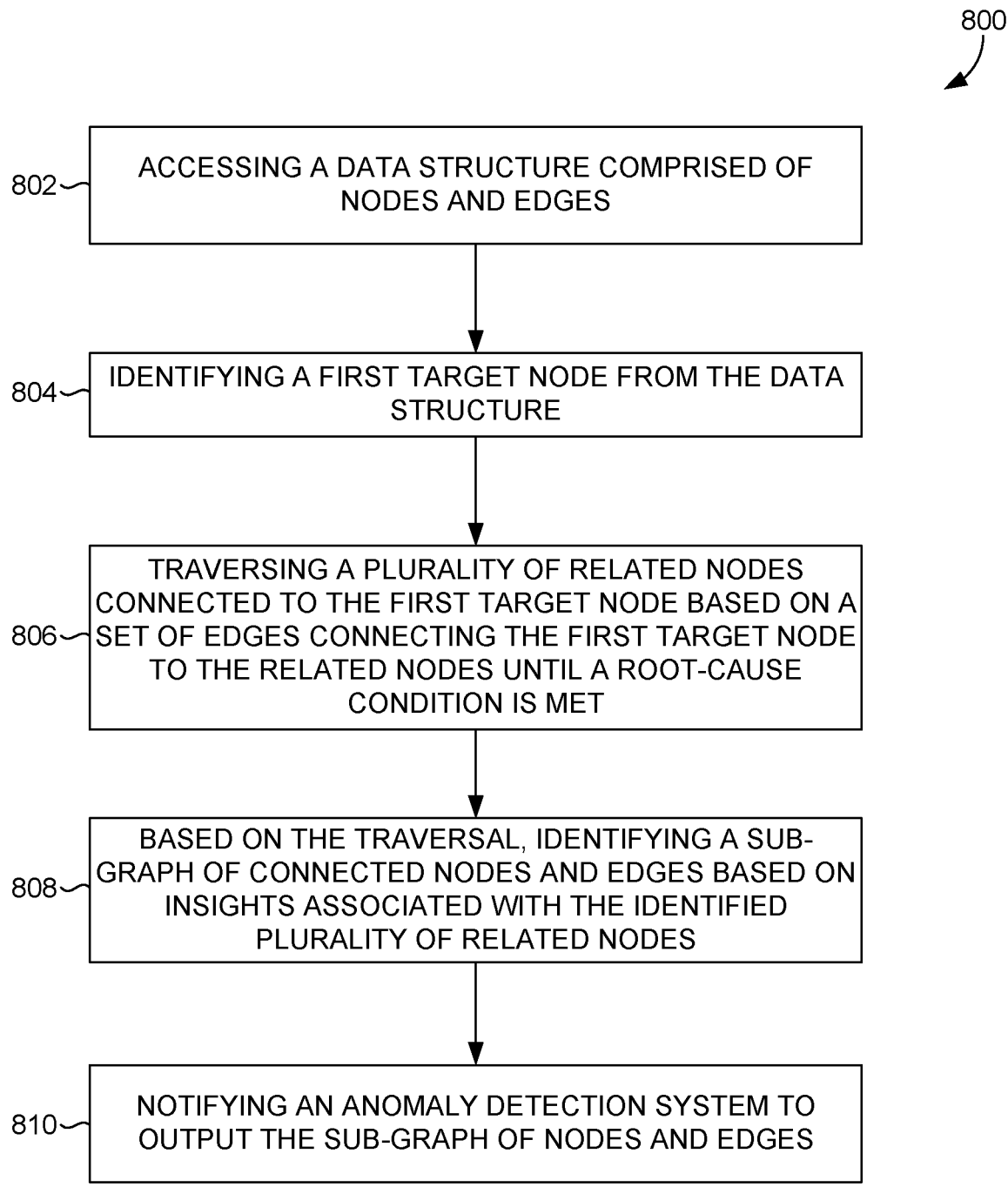
FIG. 8 is a flow diagram providing an example method of detecting malicious enterprise behaviors, in accordance with aspects of the technology described herein.

Referring now to FIG. 8, FIG. 8 shows a flow diagram providing an example method of detecting malicious enterprise behaviors, in accordance with aspects of the technology described herein. Initially, at step 802, a data structure comprised of nodes and edges is accessed. At step 804, a first target node from the data structure is identified. At step 806, a plurality of related nodes connected to the first target node are traversed based on a set of edges connected the first target node to the related nodes until a root-cause condition is met. At step 808, based on the traversal, a sub-graph of connected nodes and edges is identified based on insights associated with the identified plurality of related nodes. Although not shown for clarity, embodiments may traverse the related nodes until a stop condition is met. Based on meeting the stop condition, embodiments can halt the traversal and traverse to anther node connected to the previously traversed node. In some embodiments, previously traversed edges may be an indicator for the stop condition. Additionally, in some embodiments, the identified sub-graph may be the initial node and used to identify an additional graph and/or subgraph via edges that are connected to the sub-graph. At step 810, an anomaly detection system is notified to output the identified sub-graph of nodes and edges.

Example Distributed Computing Environment

Figure 9:
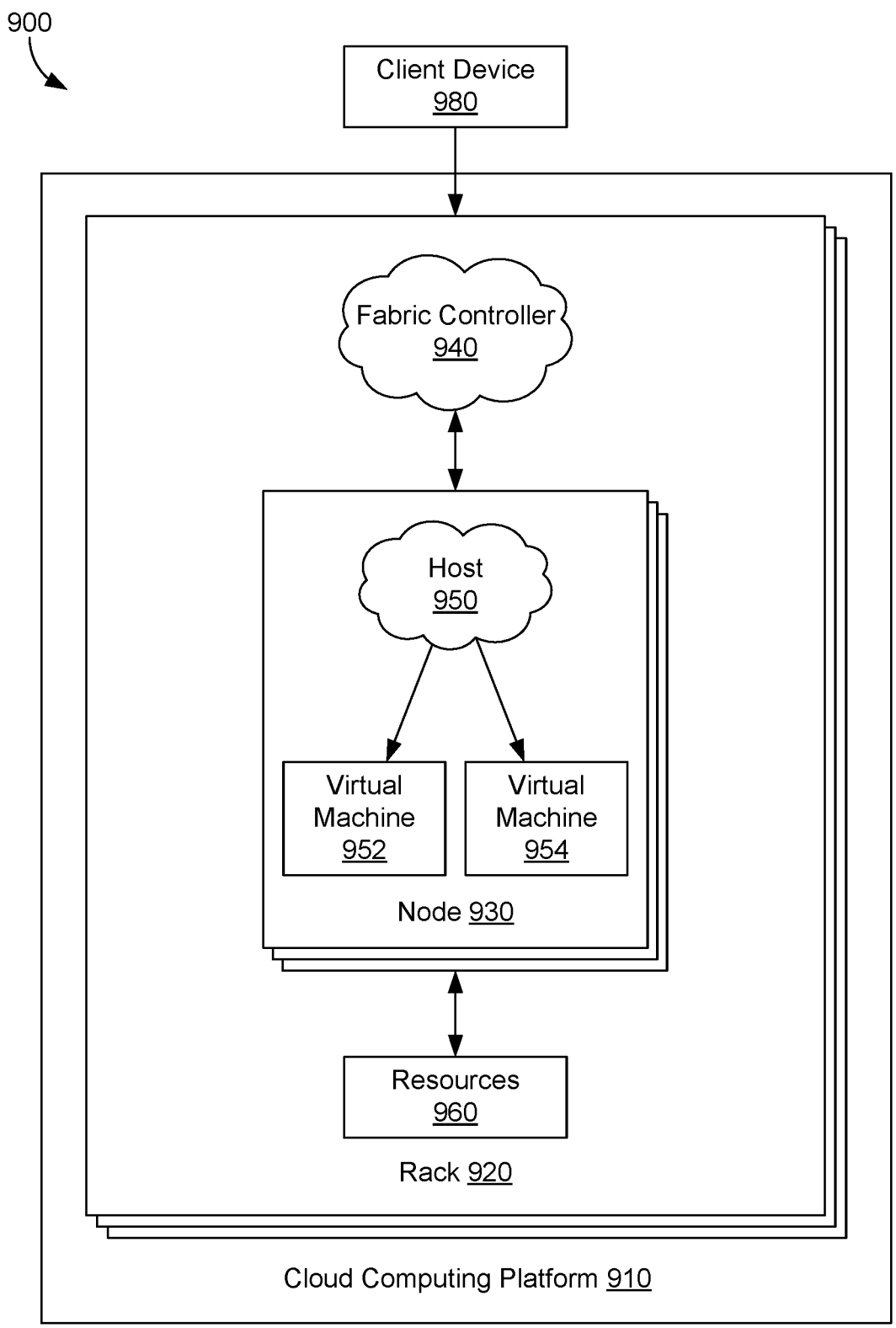
FIG. 9 provides a block diagram of an exemplary distributed computing environment suitable for use in implementing aspects of the technology described herein.

Referring now to FIG. 9, FIG. 9 illustrates an example distributed computing environment 900 in which implementations of the present disclosure may be employed. In particular, FIG. 9 shows a high-level architecture of an example cloud computing platform 910 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 800 that includes cloud computing platform 910, rack 920, and node 930 (e.g., computing devices, processing units, or blades) in rack 920. The technical solution environment can be implemented with cloud computing platform 910 that runs cloud services across different data centers and geographic regions. Cloud computing platform 910 can implement fabric controller 940 component for provisioning and managing resource allocation, deployment, upgrade, and management of cloud services. Typically, cloud computing platform 910 acts to store data or run service applications in a distributed manner. Cloud computing infrastructure 910 in a data center can be configured to host and support operation of endpoints of a particular service application. Cloud computing infrastructure 910 may be a public cloud, a private cloud, or a dedicated cloud.

Node 930 can be provisioned with host 950 (e.g., operating system or runtime environment) running a defined software stack on node 930. Node 930 can also be configured to perform specialized functionality (e.g., compute nodes or storage nodes) within cloud computing platform 910. Node 930 is allocated to run one or more portions of a service application of a tenant. A tenant can refer to a customer utilizing resources of cloud computing platform 910. Service application components of cloud computing platform 910 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 930, nodes 930 may be partitioned into virtual machines (e.g., virtual machine 952 and virtual machine 954). Physical machines can also concurrently run separate service applications. The virtual machines or physical machines can be configured as individualized computing environments that are supported by resources 960 (e.g., hardware resources and software resources) in cloud computing platform 910. It is contemplated that resources can be configured for specific service applications. Further, each service application may be divided into functional portions such that each functional portion is able to run on a separate virtual machine. In cloud computing platform 910, multiple servers may be used to run service applications and perform data storage operations in a cluster. In particular, the servers may perform data operations independently but exposed as a single device referred to as a cluster. Each server in the cluster can be implemented as a node.

Client device 980 may be linked to a service application in cloud computing platform 910. Client device 980 may be any type of computing device, which may correspond to computing device 1000 described with reference to FIG. 10, for example, client device 1000 can be configured to issue commands to cloud computing platform 910. In embodiments, client device 980 may communicate with service applications through a virtual Internet Protocol (IP) and load balancer or other means that direct communication requests to designated endpoints in cloud computing platform 910. The components of cloud computing platform 910 may communicate with each other over a network (not shown), which may include, without limitation, one or more local area networks (LANs) and/or wide area networks (WANs).

Example Operating Environment

Figure 10:
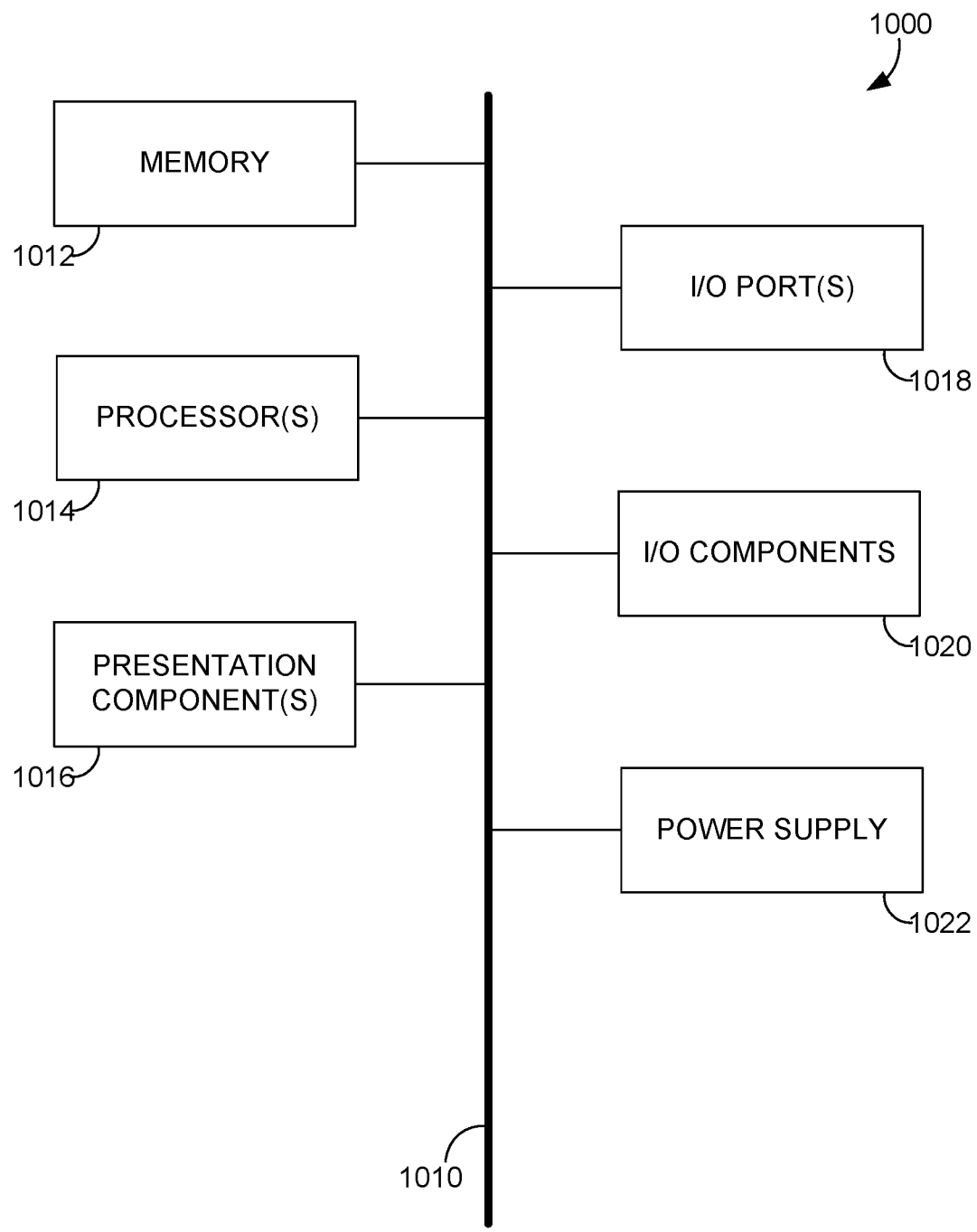
FIG. 10 is a block diagram of an exemplary computing environment suitable for use in implementing aspects of the technology described herein.

Having briefly described an overview of embodiments of the present disclosure, an example operating environment in which embodiments of the present disclosure may be implemented is described below in order to provide a general context for various aspects of the present disclosure. Referring initially to FIG. 10 in particular, an example operating environment for implementing embodiments of the present disclosure is shown and designated generally as computing device 1000. Computing device 1000 is but one example of a suitable computing environment and is not intended to suggest any limitation as to the scope of use or functionality of the disclosure. Neither should computing device 1000 be interpreted as having any dependency or requirement relating to any one or combination of components illustrated.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

With reference to FIG. 10, computing device 1000 includes bus 1010 that directly or indirectly couples the following devices: memory 1012, one or more processors 1014, one or more presentation components 1016, input/output ports 1018, input/output components 1020, and illustrative power supply 1022. Bus 1010 represents what may be one or more buses (such as an address bus, data bus, or combination thereof). The various blocks of FIG. 10 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 10 is merely illustrative of an example computing device that can be used in connection with one or more embodiments of the present disclosure. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present disclosure.

By way of example, the technical solution system can include an Application Programming Interface (API) library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

Embodiments of the present disclosure have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
one or more computer processors; and
computer memory storing computer-useable instructions that, when used by the one or more computer processors, cause the one or more computer processors to perform operations comprising:
accessing a data structure comprises of comprising a plurality of nodes and a plurality of edges, wherein the data structure is a representation of a computing environment;
identifying a target node from the data structure;
traversing a plurality of related nodes connected to the target node based on a set of edges connecting the target node to a plurality of related nodes;
based on traversing the plurality of related nodes, determining that a root-cause condition has been met, wherein the root-cause condition is associated with a node, the root-cause condition corresponds to a suspected or actual originating cause of a malicious activity in the computing environment;

based on determining that the root-cause condition that is associated with the node has been met, identifying a sub-graph of the data structure based on insights associated with the plurality of related nodes plurality of nodes and the plurality of edges of the data structure, wherein the insights of the plurality of related nodes support determining that the root-cause condition has been met; and notifying an anomaly detection system to output at least a portion of the sub-graph of the data structure.

2. The system of claim 1, wherein traversing the plurality of related nodes support detecting lateral movement of a malicious activity in the computing environment based on relationships and linking actions between the plurality of related node.

3. The system of claim 2, wherein a linking action indicates movement of a file from a first node to a second node and a subsequently executed operation associated with the file.

4. The system of claim 1, wherein the root-cause condition is associated with a plurality of root-cause conditions that cause traversing the plurality of related nodes to stop, wherein each of the plurality of root-cause conditions define stop conditions for halting traversal.

5. The system of claim 1, wherein traversing the plurality of related nodes comprises identifying the insights associated with the plurality of related nodes, wherein a machine learning model processes the insights to determine whether the root-cause condition has been met.

6. The system of claim 1, wherein the plurality of nodes and the plurality of edges are associated with behaviors identifier.

7. The system of claim 1, wherein the sub-graph comprises a set of traversed nodes from the plurality of related nodes, wherein the sub-graph is associated with an execution path of a potentially malicious activity based on a relationship analyzed between the set of traversed nodes.

8. One or more computer-storage media having computer-executable instructions embodied thereon that, when executed by a computing system having a processor and memory, cause the processor to perform operations comprising:

accessing a data structure comprises of comprising a plurality of nodes and a plurality of edges, wherein the data structure is a representation of a computing environment;

identifying a target node from the data structure;

traversing a plurality of related nodes connected to the target node based on a set of edges connecting the target node to a plurality of related nodes;

based on traversing the plurality of related nodes, determining that a root-cause condition has been met, wherein the root-cause condition is associated with a node, the root-cause condition corresponds to a suspected or actual originating cause of a malicious activity in the computing environment;

based on determining that the root-cause condition that is associated with the node has been met, identifying a sub-graph of the data structure based on insights associated with the plurality of related nodes plurality of nodes and the plurality of edges of the data structure, wherein the insights of the plurality of related nodes support determining that the root-cause condition has been met; and notifying an anomaly detection system to output at least a portion of the sub-graph of the data structure.

9. The media of claim 8, wherein traversing the plurality of related nodes support detecting lateral movement of a malicious activity in the computing environment based on relationships and linking actions between the plurality of related nodes.

10. The media of claim 9, wherein a linking action indicates movement of a file from a first node to a second node and a subsequently executed operation associated with the file.

11. The media of claim 8, wherein the plurality of nodes and the plurality of edges are associated with behaviors identifier.

12. The media of claim 8, wherein traversing the plurality of related nodes comprises identifying the insights associated with the plurality of related nodes, wherein a machine learning model processes the insights to determine whether the root-cause condition has been met.

13. The media of claim 8, wherein the root-cause condition is associated with a plurality of root-cause conditions that cause traversing the plurality of related nodes to stop, wherein each of the plurality of root-cause conditions define stop conditions for halting traversal.

14. The media of claim 8, wherein the sub-graph comprises a set of traversed nodes from the plurality of related nodes, wherein the sub-graph is associated with an execution path of a potentially malicious activity based on a relationship analyzed between the set of traversed nodes.

15. A computer-implemented method, the method comprising:

accessing a data structure comprises of comprising a plurality of nodes and a plurality of edges, wherein the data structure is a representation of a computing environment;

identifying a target node from the data structure;

traversing a plurality of related nodes connected to the target node based on a set of edges connecting the target node to a plurality of related nodes;

based on traversing the plurality of related nodes, determining that a root-cause condition has been met, wherein the root-cause condition is associated with a node, the root-cause condition corresponds to a suspected or actual originating cause of a malicious activity in the computing environment;

based on determining that the root-cause condition that is associated with the node has been met, identifying a sub-graph of the data structure based on insights associated with the plurality of related nodes plurality of nodes and the plurality of edges of the data structure, wherein the insights of the plurality of related nodes support determining that the root-cause condition has been met; and notifying an anomaly detection system to output at least a portion of the sub-graph of the data structure.

16. The method of claim 15, wherein traversing the plurality of related nodes support detecting lateral movement of a malicious activity in computing environment based on relationships and linking actions between the plurality of related nodes, wherein a linking action indicates movement of a file from a first node to a second node and a subsequently executed operation associated with the file.

17. The method of claim 15, wherein the plurality of nodes and the plurality of edges are associated with behaviors identifier.

18. The method of claim 15, wherein traversing the plurality of related nodes comprises identifying the insights associated with the plurality of related nodes, wherein a machine learning model processes the insights to determine whether the root-cause condition has been met.

19. The method of claim 15, wherein the root-cause condition is associated with a plurality of root-cause conditions that cause traversing the plurality of related nodes to stop, wherein each of the plurality of root-cause conditions define stop conditions for halting traversal.

20. The method of claim 15, wherein the sub-graph comprises a set of traversed nodes from the plurality of related nodes, wherein the sub-graph is associated with an execution path of a potentially malicious activity based on a relationship analyzed between the set of traversed nodes.

* * * * *